July 14, 1931. H. C. DOANE 1,814,245
ELECTRIC SWITCH
Filed June 13, 1927 2 Sheets-Sheet 2

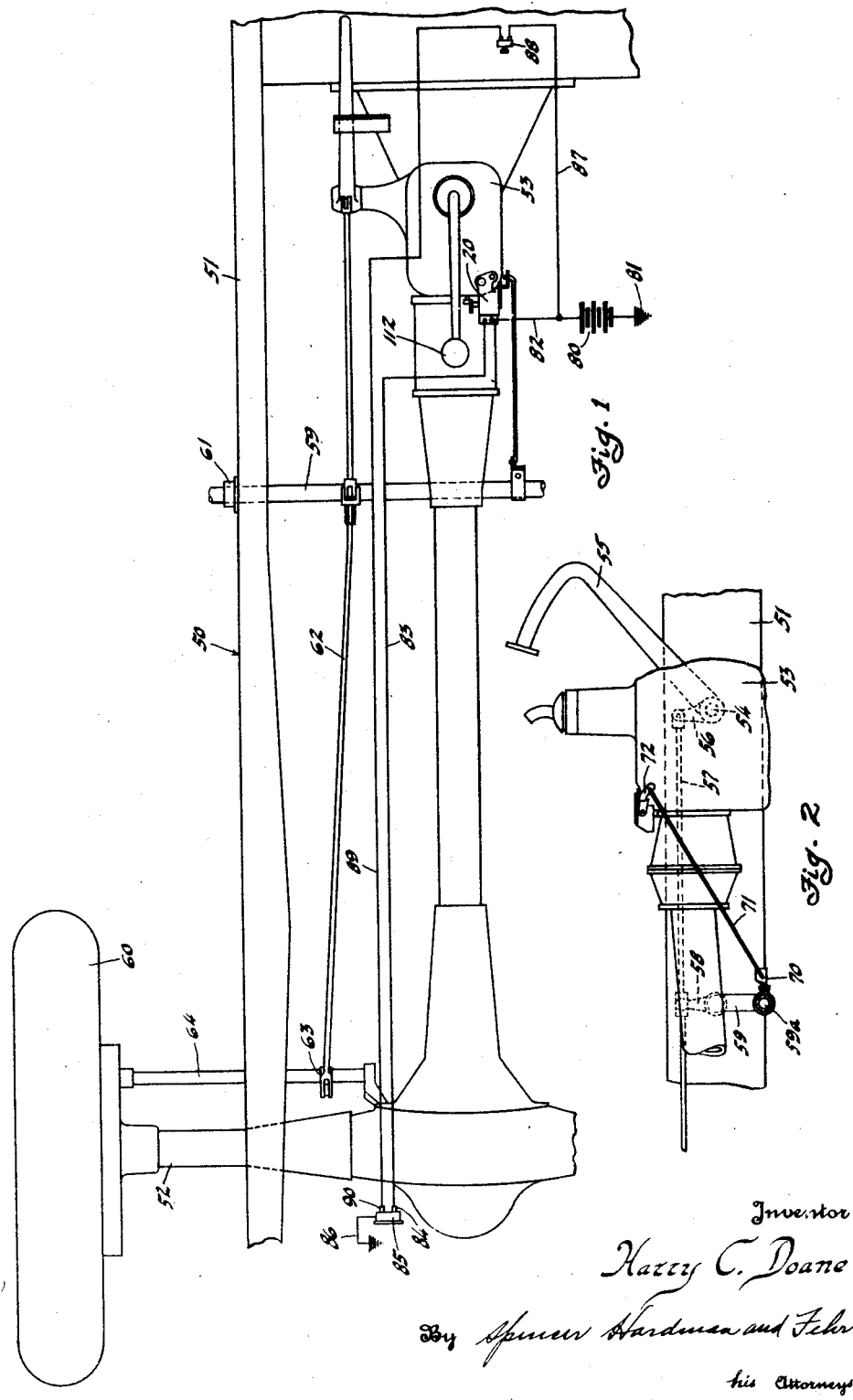

Inventor
Harry C. Doane
By Spencer Hardman & Fehr
his Attorneys

Patented July 14, 1931

1,814,245

UNITED STATES PATENT OFFICE

HARRY C. DOANE, OF FLINT, MICHIGAN, ASSIGNOR TO GENERAL MOTORS CORPORATION, OF DETROIT, MICHIGAN, A CORPORATION OF DELAWARE

ELECTRIC SWITCH

Application filed June 13, 1927. Serial No. 198,339.

This invention relates to electric switches and particularly to electric switches for controlling electrical signalling devices for automotive vehicles.

One application of the present invention is the control of an electric circuit including the stop lamp at the rear end of an automobile. Heretofore, when the requirement has been to cause the lamp to burn when the brakes are applied or when the transmission gearing is thrown into reverse so that the road at the rear of the vehicle will be illuminated while backing, the practice has been to use separate switches in the stop lamp circuit, the switches being controlled respectively by the brake pedal and by the transmission gear shift lever. One object of the present invention is to provide a single switch structure adapted to be operated either by the brake pedal or by the transmission gear shift lever for controlling a vehicle signalling device such as a stop and back-up lamp at the rear of the vehicle.

Further objects and advantages of the present invention will be apparent from the following description, reference being had to the accompanying drawings, wherein a preferred form of embodiment of the present invention is clearly shown.

In the drawings:

Fig. 1 is a diagrammatic fragmentary plan view of an automobile chassis showing a switch constructed in accordance with the present invention and the mechanism for operating it.

Fig. 2 is a fragmentary side view of the switch operating mechanism shown in Fig. 1.

Figure 6:
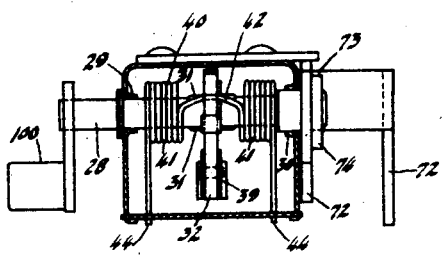
Figure 5:
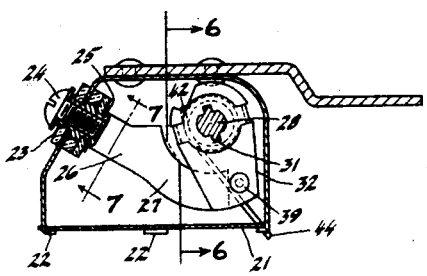
Fig. 5 is a sectional view on the line 5—5 of Fig. 3.
Figure 7:
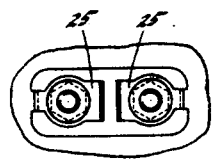

Figs. 6 and 7 are sectional views taken respectively on the lines 6—6 and 7—7 of Fig. 5.

Figure 3:
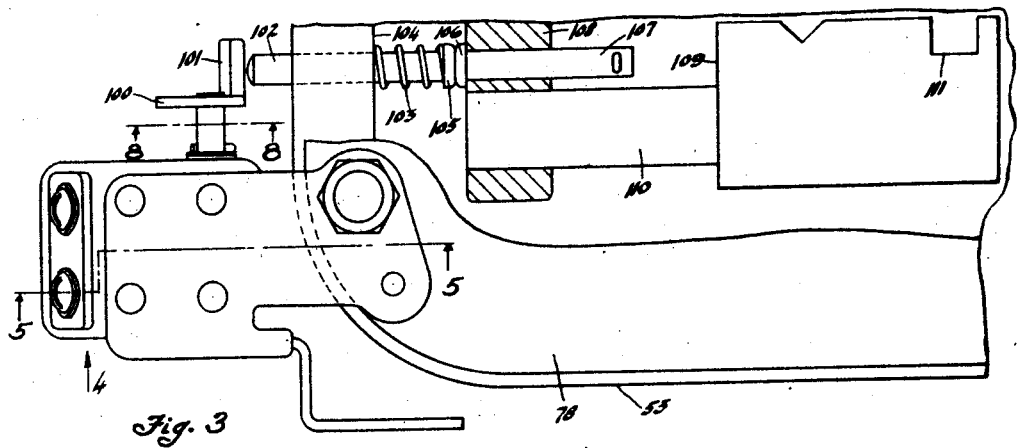
Fig. 3 is a plan view on a larger scale of the switch showing its mounting upon the transmission gear housing.
Figure 8:
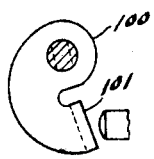

Fig. 8 is a fragmentary view on the line 8—8 of Fig. 3.

Figure 9:
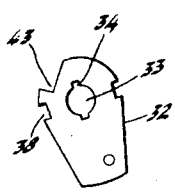

Fig. 9 is a detailed view of a non-conducting contact carrying element.

Figure 10:
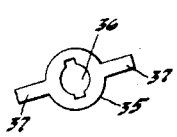

Fig. 10 is a detailed view of a reinforcing element therefor.

Referring first to Figs. 3 to 8 inclusive the switch comprises a box like case 20 provided with a cover 21 which is fixed to the case by the bent tangs 22 projecting from the marginal edge of the case. The case 20 insulatingly supports terminal rivets 23 which are tapped to receive terminal screws 24 and which secure in position as shown in Figs. 5 and 7 the bases 25 of contact members 26 each formed of resilient sheet material. Each blade 26 is provided with an arcuate portion 27 concentric with a shaft 28 which is mounted in bearings 29 and 30 provided by the switch case as shown clearly in Fig. 6.

The shaft 28 is provided with splines 31 which are driven through a contact carrier 32 of non-conducting material. The carrier 32 is provided with a hole 33 for receiving the shaft 28, said hole 33 including notches 34 for receiving the splines 31. In order to reinforce the driving connection between the shaft 28 and the contact carrier 32 there is provided a plate 35 of sheet metal having a central opening 36 of the same shape as the opening 33 of the contact carrier 32. The plate 35 is provided with ears 37 which are bent into notches 38 provided by the contact carrier 32. Thus the shaft 28 may drive the contact carrier 32 either directly through the splines 31 or indirectly through the plate 35. The carrier 32 carries a movable contact 39 in the form of a double headed rivet, each head of which is adapted to engage one of the spring conductors 27. The contact 39 is maintained normally out of engagement with the conductors 27 by a spring 40 having two coils 41 surrounding the shaft 28 and connected by a loop 42 which extends into a notch 43 provided by the contact carrier 32. The spring 40 is biased so that it tends to produce counterclockwise rotation of the carrier 32 as viewed in Fig. 5. Consequently the ends 44 of the spring 40 tend to move in a clockwise direction. The ends 44 are retained in the position shown by the cover 21.

Shaft 28 is operated by the brake pedal of a vehicle in a manner to be described. Referring to Figs. 1 and 2, 50 designates an automobile chassis including side frames, one of which is shown at 51, resting upon vehicle axles, the rear one of which is shown at 52. The frame 51 supports a transmission gear housing 53 providing a stub shaft 54 for supporting a brake pedal 55. The pedal 55 has a lever arm 56 connected by link 57 with an arm 58 connected with a rod 59 which is pivotally supported by bearings in each side frame, the bearing provided by the frame 51 being shown at 61. The rod 59 is connected in any suitable manner with the road wheel brakes of the vehicle, for example, a link 62 connects the arm 58 with a lever 63 attached to a shaft 64 for controlling the brake of the vehicle wheel 60. The rod 59 is connected by a clamp 70 with a link 71 attached to a lever 72 which is pivoted upon the shaft 28 but is not directly connected with it. The lever 72 includes an offset portion 73 adapted to engage a lever 74 which is attached to the shaft 28. It is obvious that if the pedal 55 is depressed, the rod 59 will be rotated in a clockwise direction causing its crank arm portion 59a, shown in Fig. 2, to move toward the left of the drawings. Therefore the lever 72 will be moved in a clockwise direction and will cause the shaft 28 to move the contact 39 into engagement with the contacts 27. These contacts are so arranged that a slight depression of the pedal 55 will cause an electric circuit to be made by the switch and this circuit to be maintained closed during further downward movement of the brake pedal. This movement may continue until a stop 75 provided by the lever 72 strikes the edge 76 of a bracket 77 which is used to support the switch case upon the cover 78 of the transmission gear housing 53. The circuit which is closed by the switch comprises a battery 80 grounded at 81 upon the vehicle frame and connected by wire 82 with one of the switch terminals. The other switch terminal is connected by wire 83 with a connector socket 84 of the rear end lamp 85. This connector socket 84 is connected with a lamp for illuminating a stop signal and also for illuminating the rear of the vehicle. The return circuit for the lamp is provided by a ground connection 86. As the stop signal lamp 85 usually carries the tail lamp, an electric circuit for this lamp is provided by the battery 80, a wire 87 leading from the battery to a dash switch 88 connected by a wire 89 with a lamp connector socket 90 which provides an electrical connection with the tail lamp bulb, not shown, but grounded at 86.

Figure 4:
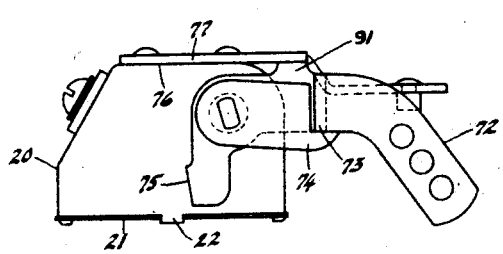
Fig. 4 is a side view thereof looking in the direction of the arrow 4 in Fig. 3.

When the pedal 55 is released it will be returned to normal position as shown in any suitable manner by springs, not shown, thereby permitting the lever 72 to return to the position shown in Fig. 4 in which a stop lug 91 provided by it may strike the surface 76 of the bracket 77.

The mechanism for operating the switch when the transmission gearing is thrown into reverse comprises a lever 100 attached to the shaft 28 and having an ear 101 located in the path of movement of a plunger 102 guided by the transmission gear housing 23. A spring 103 located between a rear wall 104 of the housing 53 and the head 105 of the plunger 102 urges the plunger away from the lever 100 and into engagement with a head 106 of a plunger 107 which is guided by a bracket 108 provided by the transmission gear housing. The plunger 107 is located in the path of movement of a plate 109 which is supported by a rod 110 and also guided by the bracket 108. The plate 109 is provided with a notch 111 which is engaged by the lower end of the transmission gear shift lever 112 when it is desired to throw the gearing into reverse. This act will cause the plate 109 to move toward the left as viewed in Fig. 3 so as to transmit motion through the plungers 107 and 102 to the ear 101 of the lever 100. Consequently the shaft 28 will be rotated clockwise as viewed in Figs. 4 and 5 and the switch will be closed so that the stop and back-up lamp will burn. When the gear shift lever is moved to throw the gearing out of reverse position, the plate 109 will move away from the plunger 107 sufficiently to permit the spring 103 to move the plunger 101 to the position shown in Fig. 3. This action will permit the spring 40 to restore the shaft 28 to the position shown in the drawings whereupon the circuit will be opened.

While the form of embodiment of the present invention as herein disclosed, constitutes a preferred form, it is to be understood that other forms might be adopted, all coming within the scope of the claims which follow.

What is claimed is as follows:

1. Apparatus for controlling a vehicle lamp comprising, in combination, an electric switch having a movable operating member including a rotary shaft having a non-conducting contact carrier thereon, means operated by the brake actuator of the vehicle for moving said switch member, and means operated by the transmission gear shift lever for moving said switch member.

2. The combination with a vehicle having shiftable transmission gearing and housing therefor, and brake mechanism, of a switch mounted upon the transmission housing and having a rotary shaft carrying levers, an endwise movable rod actuated by the shifting lever of the transmission gearing for engaging one of the levers to rotate the switch shaft, and means operated by the brake mechanism for rotating the switch shaft.

3. The combination with a vehicle having a brake mechanism, and a transmission gear housing containing gear shifting mechanism, of a switch having a case supported by the gear housing and a movable switch operating member supported by the case, said switch operating member comprising a rotary shaft with bearings in the said case and having levers attached to the ends of the shaft exterior of the case, and also having a non-conducting contact carrier intermediate its ends and within said case, means operated by the gear shifting mechanism for moving the switch operating member, and means operated by the brake mechanism for moving the switch operating member.

4. The combination with a vehicle having a brake mechanism and a transmission gear housing containing gear shifting mechanism, of a switch having a case supported by the gear housing and a rotary shaft supported by the case and extending beyond opposite sides thereof, a lever attached to each end of the shaft, separate devices respectively engageable with said levers and respectively actuated by the gear shifting mechanism and by the brake mechanism for rotating the shaft into circuit-closing position, and resilient means for urging the shaft into circuit-open position.

In testimony whereof I hereto affix my signature.

HARRY C. DOANE.